(12) United States Patent
Collet et al.

(10) Patent No.: US 8,171,083 B2
(45) Date of Patent: May 1, 2012

(54) SYSTEM FOR ENHANCING THE TRANSMISSION SECURITY OF THE E-MAILS IN THE INTERNET NETWORK

(75) Inventors: Jean-Luc Collet, La Gaude (FR); Francois-Xavier Drouet, La Gaude (FR); Gerard Marmigere, Drap (FR); Joaquin Picon, St. Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 10/596,050

(22) PCT Filed: Nov. 10, 2004

(86) PCT No.: PCT/EP2004/052907
§ 371 (c)(1),
(2), (4) Date: Jan. 24, 2007

(87) PCT Pub. No.: WO2005/053262
PCT Pub. Date: Jun. 9, 2005

(65) Prior Publication Data
US 2007/0143406 A1 Jun. 21, 2007

(30) Foreign Application Priority Data
Nov. 27, 2003 (EP) .................................. 03368104

(51) Int. Cl.
*G06F 15/16* (2006.01)
(52) U.S. Cl. ........................................................ 709/206
(58) Field of Classification Search .................. 709/202, 709/206
See application file for complete search history.

(56) References Cited

U.S. PATENT DOCUMENTS
5,937,162 A * 8/1999 Funk et al. .................... 709/206
(Continued)

FOREIGN PATENT DOCUMENTS
JP 2000216807 A 8/2000

OTHER PUBLICATIONS
IBM, "Information Materials for IDS", Japanese Office Action Dated Oct. 27, 2009.
(Continued)

*Primary Examiner* — John Macilwinen
(74) *Attorney, Agent, or Firm* — Andrea Bauer; Hoffman Warnick LLC

(57) ABSTRACT

System for enhancing the security of the e-mails transmitted from a sender (10) to a receiver (12) over a data transmission network such as Internet wherein a Message Transfer Agent (MTA) (14) associated with the sender is in charge of transmitting over the network an original e-mail sent by the sender. The MTA associated with the sender includes a message splitting means (16) adapted to divide the original e-mail into a plurality of chunks according to a predetermined algorithm and a predetermined list of relay MTAs (20, 22, 24) to which are forwarded the plurality of chunks. The system comprises a chunk assembly agent (28) for receiving from the relay MTAs the plurality of chunks and re-assembling them by using the predetermined algorithm in order to re-build the e-mail before sending it to the receiver.

12 Claims, 2 Drawing Sheets

U.S. PATENT DOCUMENTS

| | | | |
|---|---|---|---|
| 6,745,231 B1 * | 6/2004 | Megiddo | 709/206 |
| 7,117,246 B2 * | 10/2006 | Christenson et al. | 709/206 |
| 7,317,730 B1 * | 1/2008 | Devanagondi et al. | 370/412 |
| 2002/0004821 A1 * | 1/2002 | Togawa et al. | 709/206 |
| 2002/0004837 A1 * | 1/2002 | Ishiguri | 709/231 |
| 2002/0112008 A1 | 8/2002 | Christenson et al. | |
| 2002/0191796 A1 * | 12/2002 | Muschenborn | 380/277 |
| 2003/0101339 A1 | 5/2003 | Bianchini et al. | |
| 2003/0167314 A1 | 9/2003 | Gilbert et al. | |
| 2004/0190722 A1 * | 9/2004 | Grobman | 380/277 |

OTHER PUBLICATIONS

Apostolescu, International Application No. PCT/EP2004/052907, PCT International Search Report, Feb. 3, 2005, 4 pages.

Apostolescu, International Application No. PCT/EP2004/052907, PCT Written Opinion of the International Searching Authority, Mar. 4, 2005, 5 pages.

Toscano, International Application No. PCT/EP2004/052907, PCT Preliminary Report on Patentability, Feb. 2, 2006, 6 pages.

* cited by examiner

SYSTEM FOR ENHANCING THE TRANSMISSION SECURITY OF THE E-MAILS IN THE INTERNET NETWORK

TECHNICAL FIELD OF THE INVENTION

The present invention relates to the security in the transmission of the e-mails over an unsecured data transmission network and in particular relates to a system for enhancing the transmission security of the e-mails in the Internet network.

BACKGROUND ART

Today, the use of e-mails is widely spread. When the sender forwards an e-mail to a recipient, the action is immediate and unless a problem is encountered between the sender server and the recipient server, the e-mail is delivered in the recipient mailbox without any control on the way taken by the forwarded message in terms of network infrastructure.

Most countries have specific legal protections that prevent authorities and individuals from opening and reading the paper mail. Unfortunately, few countries have provided the same protections for the electronic mail, which gives individuals, companies and authorities a legal room to read the e-mails. Thus, the e-mails can be read at any of the routers along the path taken by the e-mail to reach its destination over the Internet. However, due to the growth of commercial and private contracts materialized by the electronic mail, it becomes crucial to be able to guarantee privacy of such exchanges.

To prevent attacks of e-mails, the usage of encryption algorithms either symmetric or asymmetric to secure the e-mail exchange over the Internet is widely spread. Thus, in the key encryption, there is a private key kept private for the owner, which is used to sign the data whereas a public key which can be known of many people is used for decrypting the message. To improve the security, such keys have a minimum of 40 bits but are longer and longer. For example, the symmetric algorithm Data Encryption Standard specifies 56-bit keys in some countries and 128-bit keys in other ones like the USA. Therefore, there is no doubt that such a continuous growth of the key length is not a solution for the security problem.

SUMMARY OF THE INVENTION

Accordingly, the object of the invention is to provide a system and to achieve a method which can be adapted to any kind of e-mail being transmitted over the Internet network without requiring the use of sophisticated algorithms and/or more and more long encryption keys.

The invention therefore relates to a system for enhancing the security of the e-mails transmitted from a sender to a receiver over a data transmission network such as Internet wherein a Message Transfer Agent (MTA) associated with the sender is in charge of transmitting over the network an original e-mail sent by the sender. The MTA associated with the sender includes a message splitting means adapted to divide the original e-mail into a plurality of chunks according to a predetermined algorithm and a predetermined list of relay MTAs to which are forwarded the plurality of chunks. The system comprises a chunk assembly agent for receiving from the relay MTAs the plurality of chunks and re-assembling them by using the predetermined algorithm in order to re-build the e-mail before sending it to the receiver

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
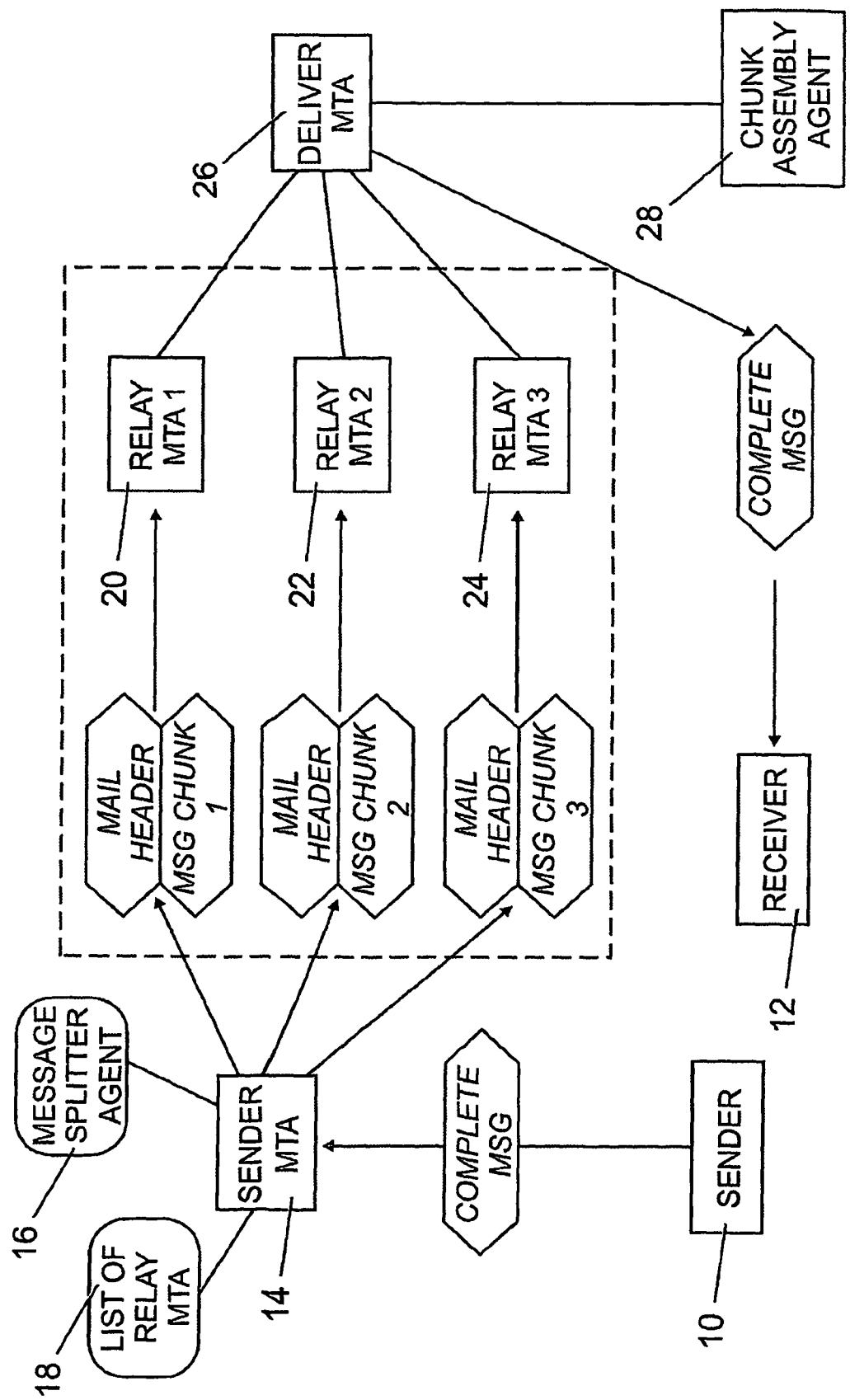
FIG. 1 is a schematic representation of a system according to the invention wherein an e-mail is divided into three chunks using three different paths over Internet.

In reference to FIG. 1, in the system according to the invention, it is assumed that a sender 10 wants to send an e-mail to a receiver 12 over the public data transmission network, that is Internet, represented inside the dotted lines in the figure.

The e-mail MSG sent by the sender 10 can be encrypted by the public key of the receiver 12 even though this is not mandatory. The e-mail MSG preferably encrypted is then provided for transmission to the associated Message Transfer Agent (MTA) 14 after adding a mail header such as the e-mail COMPLETE MSG to be forwarded is as follows:
To: receiver@dest.domain
From: sender
Subject: secure mail
ENCRYPTED TEXT
wherein receiver@dest.domain is the address of the receiver mailbox. It must be noted that this address is in clear insofar as the sender MTA 14 is a secure zone that can be the Intranet network of a company or the client device of a standalone user.

The sender MTA 14 includes two essential means according to the invention: a message splitter agent 16 and a list of relay MTAs 18. The message splitter agent 16 is in charge of dividing the received e-mail COMPLETE MSG into a plurality of chunks and to encrypt each chunk with its mail header by using the public key of a specific mailbox having the address highlysecure@dest.dom. Each new e-mail MSG CHUNK is as follows:
To: receiver@dest.domain
From: sender
Subject: secure mail
Chunk: n
Chunk count: N A same MAIL HEADER is added to each encrypted chunk before sending it over the Internet network. This MAIL HEADER is as follows:
To highlysecure@dest.domain
From: Confidential
Subject: xxx By using its list of relay MTAs 18, the sender MTA 14 forwards each encrypted chunk with its header to a different relay MTA. Thus, in the example illustrated in FIG. 1, the e-mail is divided into three e-mails forwarded to the relay MTAs 20, 22 and 24. Thus, sending a plurality of chunks to respectively a plurality of MTAs ensures a different pathway for each chunk while they transit over the unsecured public network. It must be noted that such a division into chunks can depend on the security level required by the sender.

Since all the chunk e-mails have the same destination address highlysecure@dest.domain, they are received by a single deliver MTA 26 associated with this address. Then, the deliver MTA sends the received chunk e-mails to the mailbox corresponding to the address highlysecure@dest.domain which is a chunk assembly agent 28. By using its private key, the chunk assembly agent 28 decrypts each received e-mail and can re-assemble the plurality of received chunks by using the same algorithm which has been used by the message splitter agent to divide the original e-mail into a plurality of chunks, the chunk number n included in the header being used to concatenate the chunks in the right order even if they have been received in a different order.

Finally, the original message COMPLETE MSG which has been obtained after re-assembling the chunks in the chunk assembly agent 28, is forwarded to the mailbox of the receiver 12 by the deliver MTA 26.

The scrambling algorithm used to divide the original e-mail into a plurality of chunks may be any kind of algorithm. But as mentioned above, it is essential that the chunk assembly agent uses the same algorithm to re-assemble the e-mail as the one used by the message splitter agent to divide the e-mail into chunks.

For instance, it can be assumed that each chunk is composed of the same number of n bytes. Assuming that there are m relay MTAs, the original e-mail could be divided in the following way:
Bytes from 1 to n in chunk #1 for the first relay MTA
Bytes from n+1 to 2n in chunk #2 for the second relay MTA
Bytes from 2n+1 to 3n in chunk #3 for the third relay MTA
- - -
Bytes from mn+1 to (m+1)n in chunk #m+1 for the $m^{th}$ relay MTA
Bytes from (m+1)n+1 to (m+2)n in chunk #m+2 for the first relay MTA
Bytes from (m+2)n+1 to (m+3) n in chunk #m+3 for the second relay MTA
- - -

According to another more secure embodiment, the original e-mail may be divided at the character level. A possible algorithm consists in taking sequentially each character and put it in a chunk the number of which is defined by the following formula used with X chunks:

Chunk #=1+<order number of the character> modulo $X$

Assuming that the message is "DIVIDE THE MESSAGE" and that the characters are put into 5 chunks, the chunks are the following:

| | |
|---|---|
| Chunk 1 | DE A |
| Chunk 2 | I MG |
| Chunk 3 | VTEE |
| Chunk 4 | IHS |
| Chunk 5 | DES |

Then, the chunks could be distributed randomly into the different e-mails forwarded to the relay MTAs.

Figure 2:
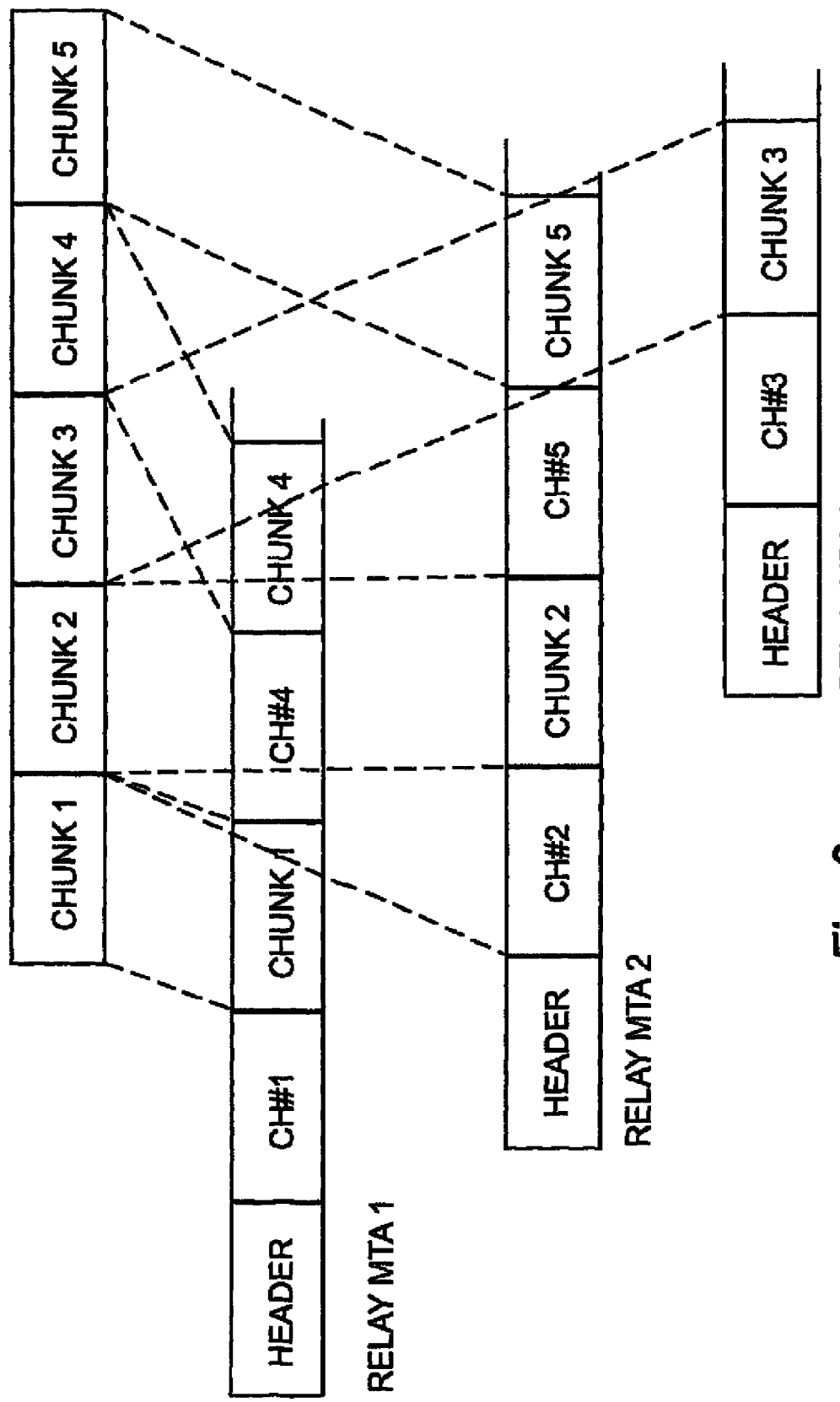
FIG. 2 is a diagram representing the original e-mail divided into five chunks distributed among three different e-mails.

Thus, assuming that there are three relay MTAs as described in FIG. 1, the original e-mail could be divided into 5 chunks as illustrated in FIG. 2. In such a case, chunk #1 and chunk #4 are included in the e-mail forwarded to relay MTA 20, chunk #2 and chunk #5 are included in the e-mail forwarded to relay MTA 22 and chunk #3 is forwarded to relay MTA 24. It must be noted that each chunk is preceded, in each e-mail, by the chunk number in order for the chunk assembly agent 28 to be able to re-assemble correctly the original e-mail even though the partial e-mails are not received in the right order.

The invention claimed is:

1. A system for enhancing security of e-mails transmitted from a sender to a receiver over a data transmission network, comprising:
   a Message Transfer Agent (MTA) operating on at least one computing device and associated with said sender for transmitting over said network an original e-mail sent by said sender according to a predetermined list of a plurality of relay MTAs;
   said MTA associated with said sender including a message splitting agent operating on the least one computing device and adapted to divide said original e-mail into a plurality of chunks according to a predetermined algorithm, wherein each of said plurality of chunks is forwarded to a different one of the plurality of relay MTAs on the predetermined list such that each of said plurality of chunks is transmitted over a different randomly selected pathway of the data transmission network, wherein message splitting means divides the plurality of chunks of the original e-mail at the character level, and wherein each of the plurality of chunks is preceded by a chunk number and a chunk count; and
   a chunk assembly agent operating on at least one computing device for receiving from said relay MTAs the plurality of chunks, said chunks received at a first mailbox corresponding to the chunk assembly agent, and for re-assembling the plurality of chunks using said predetermined algorithm, the chunk number, and the chunk count in order to re-build said e-mail before sending it to a second mailbox corresponding to said receiver, wherein each of said plurality of chunks is transmitted through a different relay MTA of the plurality of relay MTAs as a chunk e-mail, each chunk e-mail including a same mail header having a same destination e-mail address, the chunk number, and the chunk count, the destination e-mail address comprising an e-mail address of the chunk assembly agent.

2. The system according to claim 1, wherein each of said plurality of chunks is encrypted using a public key of said chunk assembly agent before being transmitted over said network.

3. The system according to claim 1, wherein the predetermined algorithm is "chunk #=1+<order number of the character>modulo x".

4. A method for enhancing security of e-mails transmitted from a sender to a receiver over a data transmission network wherein a Message Transfer Agent (MTA) associated with said sender is in charge of transmitting an original e-mail sent by said sender, comprising:
   dividing said original e-mail into a plurality of chunks using a predetermined algorithm, wherein dividing the original e-mail comprises division of the original e-mail at the character level, and wherein each of the plurality of chunks is preceded by a chunk number and a chunk count,
   sending said chunks as e-mails over the data transmission network to a plurality of relay MTAs defined in a predetermined list of relay MTAs, wherein each of said plurality of chunks is sent to a different one of the plurality of relay MTAs on the predetermined list such that each of said plurality of chunks is transmitted over a different pathway of the data transmission network,
   receiving from said relay MTAs the plurality of chunks, said chunks received a first mailbox corresponding to the chunk assembly agent, and
   re-assembling by the chunk assembly agent said chunks in order to re-build said original e-mail by using said predetermined algorithm, the chunk number, and the chunk count, before sending said original e-mail to a second mailbox corresponding to said receiver,
   wherein each of said chunks is transmitted through a different randomly selected relay MTA of the plurality of relay MTAs as a chunk e-mail, each chunk e-mail including a same mail header having a same destination e-mail address, the chunk number, and the chunk count, the destination e-mail address comprising an e-mail address of the chunk assembly agent.

5. The method according to claim 4, wherein each chunk is encrypted using a public key of said chunk assembly agent before being transmitted, each said encrypted chunk being decrypted when received by said chunk assembly agent using a private key.

6. The method according to claim 5, wherein text of said original e-mail is encrypted by using the public key of said receiver before being divided into a plurality of chunks.

7. The method according to claim 4, wherein the predetermined algorithm is "chunk #=1+<order number of the character>modulo x".

8. A security system, comprising:
a Message Transfer Agent (MTA) operating on at least one computing device and associated with a sender for transmitting over a network an original e-mail sent by the sender, the MTA including a message splitting system operating on the at least one computing device for dividing the original e-mail into a plurality of chunks according to a predetermined algorithm and for forwarding the plurality of chunks to a plurality of relay MTAs defined in a predetermined list of relay MTAs, wherein each of said plurality of chunks is forwarded to a different one of the plurality of relay MTAs on the predetermined list such that each of said plurality of chunks is transmitted over a different randomly selected pathway of a data transmission network, wherein the splitting system divides the plurality of chunks of the original e-mail at the character level, and wherein each of the plurality of chunks is preceded by a chunk number and a chunk count; and
a chunk assembly agent operating on at least one computing device for receiving from the plurality of relay MTAs the plurality of chunks, said chunks received at a first mailbox corresponding to the chunk assembly agent, and for re-assembling the plurality of chunks using the predetermined algorithm, the chunk number, and the chunk count in order to re-build the e-mail before sending it to a second mailbox corresponding to a receiver, wherein each of said plurality of chunks is transmitted through a different relay MTA of the plurality of relay MTAs a chunk e-mail, each chunk e-mail including a same mail header having a same destination e-mail address, the chunk number, and the chunk count, the destination e-mail address comprising an e-mail address of the chunk assembly agent.

9. The system according to claim 8, wherein the message splitting system encrypts each of the plurality of chunks using a public key associated with the chunk assembly agent.

10. The system according to claim 8, wherein the predetermined algorithm is "chunk #=1+<order number of the character>modulo x".

11. A security system, comprising:
a chunk assembly agent operating on at least one computing device for:
receiving from a plurality of relay Message Transfer Agents (MTAs) over a data transmission network a plurality of chunks of an original e-mail that has been divided into the plurality of chunks according to a predetermined algorithm, said chunks received at a first mailbox corresponding to the chunk assembly agent, wherein each of the plurality of chunks is received from a different one of the plurality of relay MTAs such that each of said plurality of chunks is received over a different randomly selected pathway of the data transmission network as a chunk e-mail, wherein the plurality of chunks of the original e-mail are divided at the character level, and wherein each of the plurality of chunks is preceded by a chunk number and a chunk count,
wherein each chunk e-mail of said plurality of chunks includes a same mail header having a same destination e-mail address, the chunk number, and the chunk count, the destination e-mail address comprising an e-mail address of the chunk assembly agent; and
re-assembling the plurality of chunks using the predetermined algorithm, the chunk number, and the chunk count in order to re-build the e-mail before sending it to a second mailbox corresponding to a receiver.

12. The system according to claim 11, wherein the predetermined algorithm is "chunk #=1+<order number of the character>modulo x".

* * * * *